United States Patent [19]

Valentine

[11] 4,161,760

[45] Jul. 17, 1979

[54] SHORT CIRCUIT PROTECTION OF REGULATED POWER SUPPLIES

[75] Inventor: William R. Valentine, Andover, Mass.

[73] Assignee: The United States of America as represented by the Secretary of the Army, Washington, D.C.

[21] Appl. No.: 907,648

[22] Filed: May 22, 1978

[51] Int. Cl.[2] .................................... H02H 3/24

[52] U.S. Cl. .................................... 361/18; 307/317 A

[58] Field of Search .................... 361/18, 42, 92; 323/22 Z, 22 T, 39; 307/317 A, 318

[56] References Cited

U.S. PATENT DOCUMENTS

| | | | |
|---|---|---|---|
| 3,031,608 | 4/1962 | Von Eschen et al. | 323/22 T |
| 3,886,410 | 5/1975 | Seer, Jr. | 361/18 |
| 3,924,158 | 12/1975 | Farnsworth | 361/18 |

*Primary Examiner*—Harry E. Moose, Jr.

*Attorney, Agent, or Firm*—Nathan Edelberg; Jeremiah G. Murray; Bernard Franz

[57] ABSTRACT

A Schottky diode, whose forward voltage is 0.4 volts is connected between the load and one input of the sense amplifier, which has a minimum operating voltage of 0.6 volts. When the load becomes short circuited or drops to a very low resistance, the Schottky diode conducts to shut down the sense amplifier, which cuts off the series pass transistor. When the load resistance rises to a predetermined value, the Schottky diode becomes reverse biased, permitting the regulator to return to its normal regulation operation.

6 Claims, 4 Drawing Figures

SHORT CIRCUIT PROTECTION OF REGULATED POWER SUPPLIES

The invention described herein may be manufactured and used by or for the Government for governmental purposes without the payment of any royalties thereon or therefor.

BACKGROUND OF THE INVENTION

This invention relates to short circuit protection of regulated power supplies, and more particularly to protection of power supplies having series pass transistors controlled by sense amplifiers to maintain constant load voltage.

The most common method of short circuit protection has been to sense the current drawn by the regulator load. When the current becomes excessive, the resulting voltage drop across the sensing element activates a protection circuit which in turn limits the current to a designed maximum. The disadvantages are that (1) the pass transistor is at maximum disipation under short circuit conditions, (2) the load regulation characteristics are greatly degraded, and (3) the regulator circuitry is active under short circuit conditions.

Another technique is to sense the output voltage of a regulator. When the output voltage falls, due to a short circuit, the lack of voltage activates a shut-down circuit. This control inhibits the regulator by removing input power. The regulator circuit remains inhibited until the input voltage is removed and reapplied to the protection circuitry. The disadvantages are that the circuit complexity and component count is greatly increased, and manual restart is normally required.

SUMMARY OF THE INVENTION

The object of this invention is to provide a circuit which protects each regulator from burn-out or overstress when the load is short circuited or less than a designated ohmic value, designed to shut down all active components of the regulator when a malfunction of the load occurs, provide automatic restart when the malfunction is corrected, and accomplish these with a minimum number of components.

According to the invention, a diode is connected between the load and an input of the sense amplifier, the diode having a lower forward voltage drop than the normal operating input voltage of the sense amplifier, so that the sense amplifier becomes biased to cut off when the load is short circuited, which in turn biases the series pass device to cut off. The regulator returns to normal operation whenever the load resistance is above a predetermined value.

DETAILED DESCRIPTION

Figure 1:
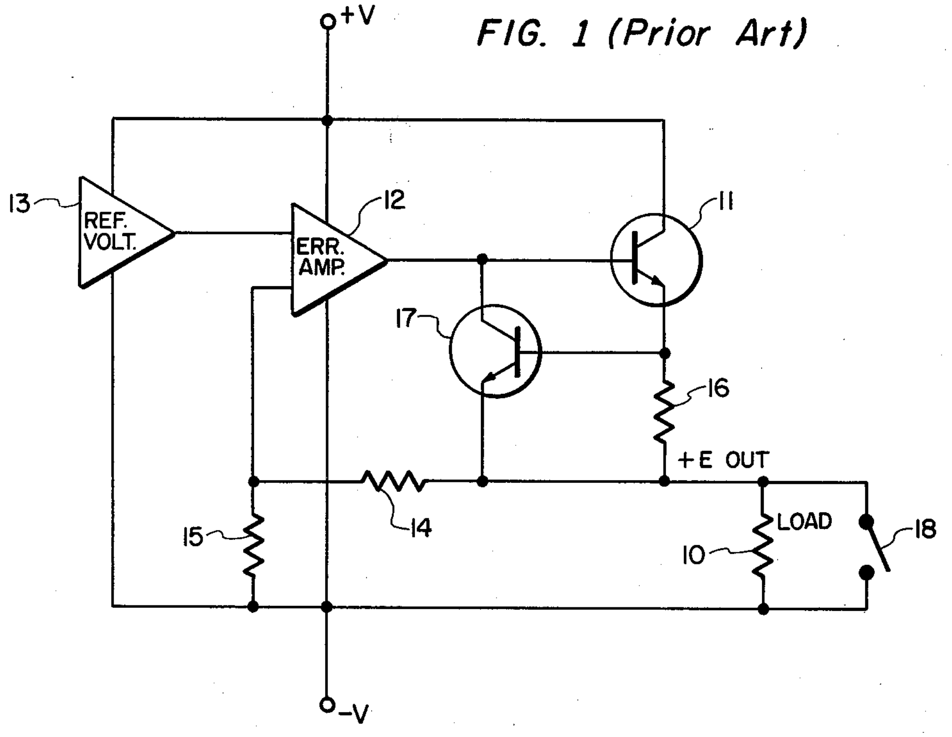
FIG. 1 (Prior Art)
FIG. 1 is a diagram of a prior art current sensing protection circuit.

The diagram of FIG. 1 illustrates a basic regulator circuit with prior art current limiting. The load represented by a resistor 10 is supplied direct current power from a supply terminal +V via a series pass transistor 11. An error amplifier 12 has one input from a reference voltage circuit 13, and another input from the junction of resistors 14 and 15 connected across the load to sense the voltage thereof. Overload protection is provided by a current sensing limit resistor 16 and a current limit transistor 17. When the load current increases due to a short circuit (represented by closure of switch 18), the resulting voltage drop across resistor 16 becomes sufficient to cause transistor 17 to conduct. This shunts current away from the base of the pass transistor 11 and results in limiting current into the shorted load.

Some basic series regulation circuits are shown in "Handbook of Semiconductor Electronics" edited by Lloyd P. Hunter, McGraw-Hill Book Company, 1962, page 17-19 through page 17-21. Some basic regulator circuits are also shown in the "Radio Amateur's Handbook," ARRL Newington, Conn.—see for example pages 122-126 of the 1973 edition, with a current limiter on page 126.

Figure 2:
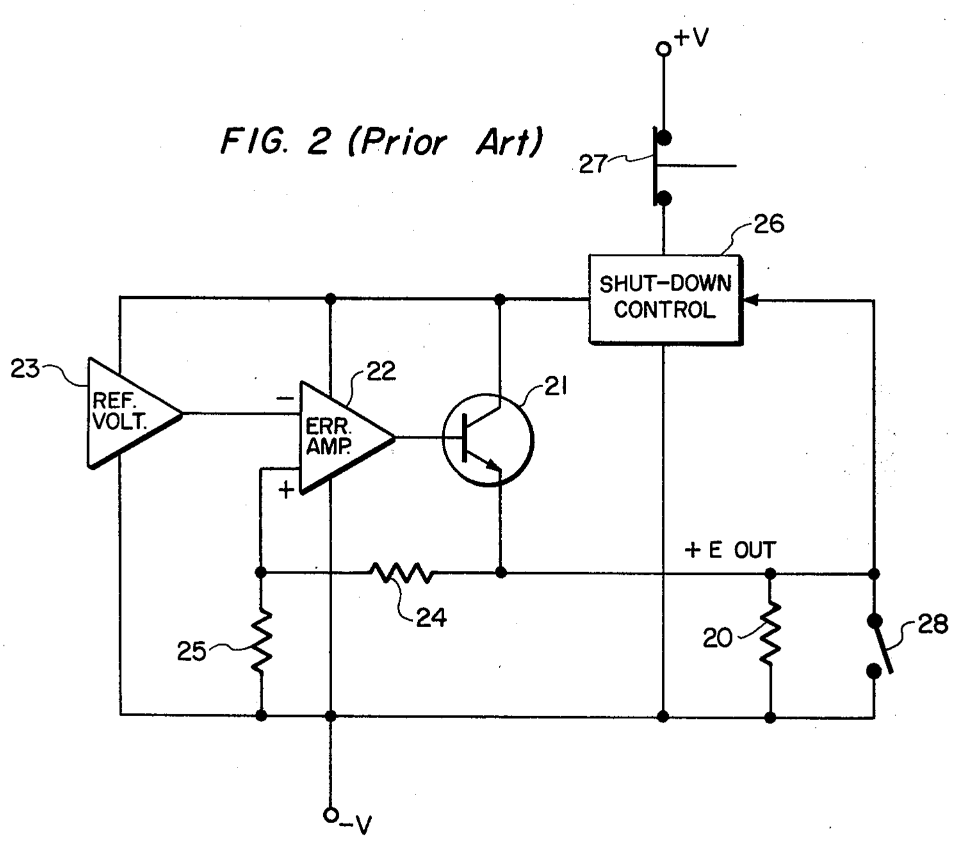
FIG. 2 (Prior Art)
FIG. 2 is a diagram of a prior art shut down protection circuit.

A second prior art technique for overload protection is shown in the diagram of FIG. 2. The basic regulator circuit is the same as that shown in FIG. 1. The technique for overload protection is to sense the output voltage of the regulator. When the output voltage falls, due to a short circuit (switch 28 closed), the lack of voltage activates a shut-down circuit 26, which inhibits the regulator by removing input power. The regulator circuit remains inhibited until the input voltage is removed and reapplied to the protection circuitry, as by opening and then closing switch 27.

Figure 3:
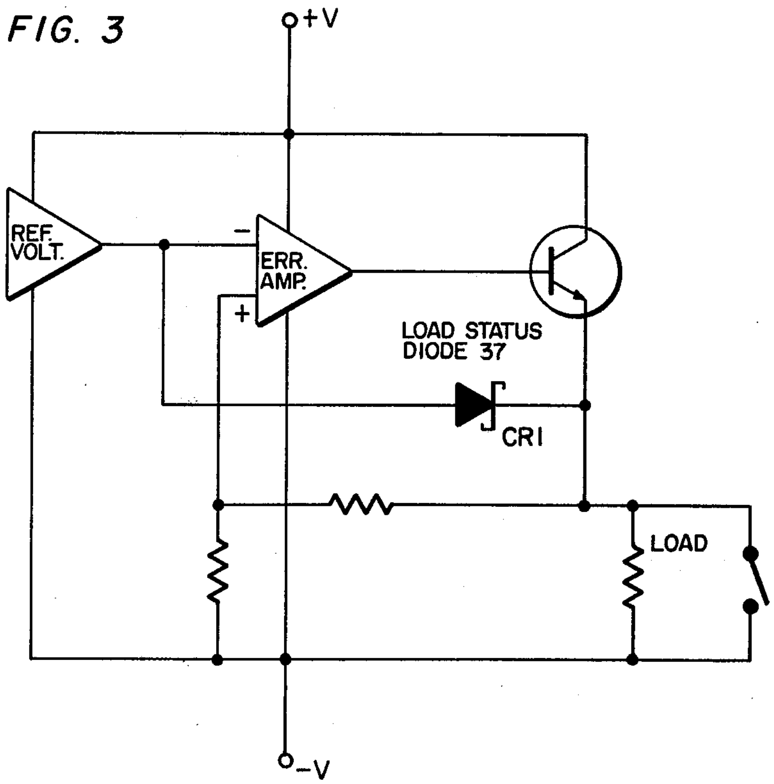
FIG. 3 is a diagram of a basic regulator circuit with protection according to the invention.
Figure 4:
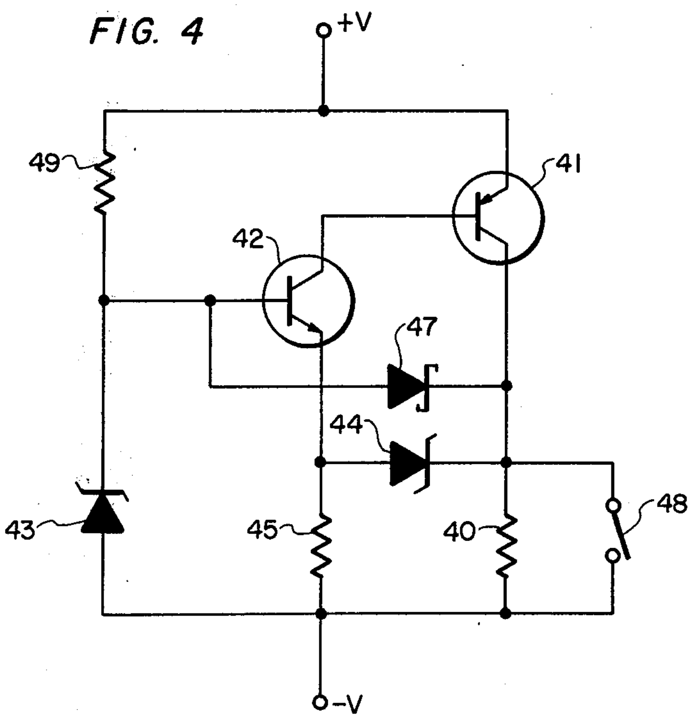
FIG. 4 is a schematic diagram of a basis 9-volt regulator with protection according to the invention.

A new protection technique is shown in FIGS. 3 and 4, which provides the same protection as those shown in FIGS. 1 and 2, with the elimination of the disadvantages mentioned in the "Background" section.

In FIG. 3, the components of the basic regulator are the same as is shown in FIGS. 1 and 2. The only addition to the existing circuitry is a single diode 37 connected from the output back to the reference input (non-inverting) of the error amplifier. It is the usual forward characteristics of this silicon diode that makes this scheme feasable. The industry name of the device is a Schottky diode. Its forward voltage drop is nominally 0.4 volts whereas a normal silicon diode or transistor base-to-emitter junction is 0.6 volts.

The schematic diagram of FIG. 4 shows a basic 9-volt regulator, which is slightly different from that in the other figures. Transistor 41, the series pass amplifying device, has its emitter connected to the +V supply and its collector connected to the load 40. Transistor 42 is the error amplifier. Its collector is connected to the base of the series pass transistor 41 to control the current to the load. The reference voltage at the base of transistor 42 is provided from the junction of a 1500-ohm resistor 49 and a 3.3 volt Zener diode 43 connected in series across the supply. To provide the sense voltage, a 6.3-volt Zener diode 44 is connected from the load to the emitter of transistor 42, and a 180-ohm resistor 45 is connected from the emitter to the −V reference terminal. Thus when the load is at +9 volts, the emitter of transistor 42 is at 2.7 volts, and there is a 0.6 volt forward bias potential between the base and emitter. If the load voltage drops, the error amplifier emitter voltage drops by the same amount. This increases the current through transistor 42, which in turn increases the current through the series pass transistor 41 and the load, thereby increasing the load voltage. Similarly an increase in the load voltage causes a reduction in current through transistors 42 and 41 to restore the load voltage to its nominal value.

In one exemplary embodiment for a normal load of 60 Ohms at 9 volts, working from a 21-volt direct current supply, the series pass transistor 41 is type 2N6049, and the error amplifier transistor 42 is type 2N2222A. The Zener diodes 43 and 44 are types 1N746 and 1N5525 respectively.

To provide overload protection, a Schottky diode 47 (which may be type HP 5082-2900) is connected from the load to the base of transistor 42. Under normal load conditions, diode 47 is electrically out of the load circuit, since it is reverse biased by 5.7 volts. When the load is short circuited (represented by closure of switch 48), the cathode of diode 47 is grounded and the base voltage of transistor 42 is clamped to 0.4 volts. This voltage shuts down the error amplifier, because it is insufficient to forward bias the transistor 42. With the collector current cut off from transistor 42, there is no currrent at the base terminal of the series pass transistor 41, and it is also cut off. The only current flow in the circuit is through resistor 49 and diode 47 to ground (the shorted load). The circuit will remain in this state until the shorted condition of the load is modified.

Automatic restart of the regulator can occur only if the error amplifier transistor 42 is returned to a conducting state. This turn-on requires the base potential to increase to a nominal 0.6 volts. To achieve this condition, the load has to increase from zero ohms to a resistance that produces 0.2 volts drop. At this point, the voltage drop of the load status diode 47 and the corrected load is sufficient to produce base current to transistor 42. The resulting turn-on of transistor 42 causes the series pass transistor 41 to conduct and produce a parallel path of current into the corrected load. At this point, the circuit becomes regenerative and results in the regulator returning to normal operation. The load status diode is again reverse biased and placed in a standby status.

The circuit shown in FIG. 4 was designed to support a normal load of 60 ohms. The shutdown circuitry was designed to respond to a 17-ohm load condition. That is, if the load were less than 17 ohms, the regulator would not turn on. If greater than 17 ohms, the regulator assumes normal operation. Adjusting the value of resistor 49 will modify the response value. For example, if the value of resistor 49 is doubled, the current through it is halved and the corrected load would have to be greater than 34 ohms for regulator turn on.

Various modifications will be apparent to those skilled in the art. For example, the series pass transistor may be replaced by an amplifying device comprising two or more transistors with a Darlington or parallel connection, or a different type of amplifying device. The error amplifier may use any suitable type of devices with one or more stages. The reference and load voltage sensing circuits may use batteries or low current power supplies.

What is claimed is:

1. An overload protection circuit for a voltage regulator connected between a power source and a load;

wherein the voltage regulator comprises a series pass amplifying device having a control electrode, an error amplifier having an output terminal and input terminal means comprising at least first and second terminals, the error amplifier having at least one error amplifying device with an input circuit coupled to the first terminal, sensing means coupled to the load to provide a sense signal which is a function of the output voltage across the load; with the series pass amplifying device connected in series between the power source and the load, the sensing means coupled to the input terminal means, and the output terminal coupled to the control electrode, so that the sense signal amplified by the error amplifier controls the current through the series pass amplifying device to maintain the load voltage within a small predetermined range under normal conditions;

the improvement wherein said overload protection circuit comprises a diode connected between said first terminal and one side of the load, the diode having a forward voltage drop which is significantly lower than the minimum operating internal voltage drop of said input circuit of the error amplifier, the diode being reverse biased for the normal range of load voltage, the diode being forward biased in response to a short circuit of the load which causes a low voltage condition between the first and second terminals to cut off the sense amplifier which in turn produces a signal condition at the control electrode to cut off the series pass amplifying device.

2. A circuit as set forth in claim 1, wherein said series pass amplifying device is a transistor having emitter, base and collector electrodes, said control electrode being the base electrode.

3. A circuit as set forth in claim 1 or 2, wherein said diode is a Schottky diode which has a silicon junction with a forward voltage drop of approximately 0.4 volts, and said input circuit of the error amplifier includes a silicon junction with a forward voltage drop during operation of approximately 0.6 volts.

4. A circuit as set forth in claim 3, wherein said voltage regulator includes reference voltage means having resistance means between said power source and said first terminal, so that during a short circuit of the load current flows through said resistance means and said diode in series, until the resistance of the load becomes sufficient to provide a voltage drop of at least 0.2 volts and to produce a voltage at said first terminal to activate the error amplifier and bring the voltage regulator into normal operation.

5. A circuit as set forth in claim 4, wherein said error amplifier comprises a transistor having emitter, base and collector electrodes, said first and second terminals being respectively the base and emitter electrodes of the error amplifier transistor, and the second terminal is coupled to voltage sensing means connected across the load.

6. A circuit as set forth in claim 5, wherein a reference point is common to the power source and the load, the voltage reference means includes a Zener diode between the first terminal and the reference point, and the voltage sensing means comprises a Zener diode between said one side of the load and the second terminal and resistance means between the second terminal and the reference point.

* * * * *